(12) United States Patent (10) Patent No.: US 12,640,422 B2
Nogami (45) Date of Patent: May 26, 2026

(54) SEALED BATTERY

(71) Applicant: SANYO Electric Co., Ltd., Kadoma (JP)

(72) Inventor: Takahiro Nogami, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 561 days.

(21) Appl. No.: 18/026,511

(22) PCT Filed: Sep. 13, 2021

(86) PCT No.: PCT/JP2021/033484
§ 371 (c)(1),
(2) Date: Mar. 15, 2023

(87) PCT Pub. No.: WO2022/065097
PCT Pub. Date: Mar. 31, 2022

(65) Prior Publication Data
US 2023/0344046 A1 Oct. 26, 2023

(30) Foreign Application Priority Data
Sep. 24, 2020 (JP) ................................ 2020-159307

(51) Int. Cl.
*H01M 50/183* (2021.01)
*H01M 10/0587* (2010.01)
(Continued)

(52) U.S. Cl.
CPC ..... *H01M 50/183* (2021.01); *H01M 10/0587* (2013.01); *H01M 50/107* (2021.01); *H01M 50/593* (2021.01)

(58) Field of Classification Search
CPC ............. H01M 50/183; H01M 50/107; H01M 50/593; H01M 10/0587
See application file for complete search history.

(56) References Cited

U.S. PATENT DOCUMENTS

2007/0141449 A1* 6/2007 Kim .................... H01M 50/171
429/185

FOREIGN PATENT DOCUMENTS

| JP | 10-223205 A | 8/1998 |
| JP | 2007-216662 A | 8/2007 |
| | (Continued) | |

OTHER PUBLICATIONS frpinsulation.com (Year: 2020).*

(Continued)

*Primary Examiner* — Jimmy Vo
(74) *Attorney, Agent, or Firm* — WHDA, LLP

(57) ABSTRACT

A sealed battery is one example of an embodiment, and is provided with an electrode body, a bottomed cylindrical outer package can that houses the electrode body, a sealing body that seals up an opening part of the outer package can, and insulating plates each placed between the respective end faces of the electrode body and the outer package can. A first face of each of the insulating plates faces the electrode body. The outer edge of the first face stands on the insulating plate outside the outer edge of a second face of each of the insulating plates which is on the opposite side of the first face. The sealed battery, which is one example of an embodiment, is provided with a top insulating plate and a bottom insulating plate as the insulating plates.

7 Claims, 4 Drawing Sheets

(51) Int. Cl.
    *H01M 50/107*     (2021.01)
    *H01M 50/593*     (2021.01)

(56)            References Cited

FOREIGN PATENT DOCUMENTS

| | | | | |
|---|---|---|---|---|
| JP | 2009-286114 A | | 12/2009 | |
| JP | 2010-9841 A | | 1/2010 | |
| JP | 2013093294 A | * | 5/2013 | |
| JP | 2015-067655 A | | 4/2015 | |
| JP | 2018028962 A | * | 2/2018 | ......... H01M 50/107 |
| JP | 2019-121434 A | | 7/2019 | |
| KR | 10-2008-0018471 A | | 2/2008 | |
| KR | 101958523 B1 | * | 3/2019 | ............. H01M 2/26 |

OTHER PUBLICATIONS

JP 2013093294 English Translation (Year: 2013).*
JP 2018028962 English Translation (Year: 2018).*
KR 101958523 English Translation (Year: 2019).*
Office Action dated May 27, 2025, issued in counterpart JP Application No. 2022-551890. (6 pages).
Extended Supplementary European Search Report dated Sep. 13, 2024, issued in counterpart Application No. 21872227.0. (7 pages).
International Search Report dated Nov. 22, 2021, issued in counterpart International Application No. PCT/JP2021/033484 (2 pages).

* cited by examiner

SEALED BATTERY

CROSS-REFERENCE TO RELATED APPLICATION

This application is a National Phase Application filed under 35 U.S.C. § 371 of International Application No. PCT/JP2021/033484 filed on Sep. 13, 2021 which claims the benefit of priority under 35 U.S.C. § 119 (a) of Japanese Patent Application No. 2020-159307 filed in Japan on Sep. 24, 2020, the contents of which are incorporated herein by reference.

TECHNICAL FIELD

The present disclosure relates to a sealed battery.

BACKGROUND

There have heretofore been widely known sealed batteries including an electrode assembly, an outer housing can in which the electrode assembly is housed, the outer housing can having a cylindrical shape with a closed bottom, a sealing assembly for sealing an opening of the outer housing can, and an insulating plate disposed between the electrode assembly and the outer housing can. An example of such a sealed battery is a cylindrical battery including a wound electrode assembly and an outer housing can having a cylindrical shape with a closed bottom. For example, Patent Document 1 discloses a cylindrical battery including an insulating plate disposed between a bottom portion of the outer housing can and the electrode assembly.

FIG. 5 is a cross-sectional view of a conventional cylindrical battery 100, illustrating the outer periphery of a lower insulating plate 101 and its vicinity in an enlarged view. As illustrated in FIG. 5, the lower insulating plate 101 is disposed between a bottom portion 102*a* of an outer housing can 102 and an electrode assembly 103 and covers a large area below the electrode assembly 103, extending to an outer circumferential portion of the electrode assembly 103. In the example illustrated in FIG. 5, a negative electrode 112 and the outer housing can 102 are electrically connected to each other, and the outer housing can 102 functions as a negative electrode terminal. In this case, the lower insulating plate 101 is interposed between the bottom portion 102*a* and a positive electrode 111 to provide a structure in which the bottom portion 102*a* and the positive electrode 111 do not directly face each other.

CITATION LIST

Patent Literature

Patent Document 1: JP H10-223205 A

SUMMARY

Technical Problem

As described above, the cylindrical battery 100 includes the lower insulating plate 101 interposed between the bottom portion 102*a* of the outer housing can 102 and the positive electrode 111; however, a relative position between the lower insulating plate 101 and the electrode assembly 103 may deviate from an intended position due to, for example, vibration or shock acting during the use of the battery, or expansion or shrinkage of the electrode assembly

103. In this case, it is anticipated that the positive electrode 111 will be brought into a condition in which it directly faces the bottom portion 102*a* without the lower insulating plate 101 interposed between them. Typically, the outer housing can has a corner portion that forms a curved R portion in, for example, a boundary portion between the bottom portion 102*a* and a side portion 102*b*, and an increase in size of the insulating plate results in interference of the insulating plate with the corner portion of the outer housing can. Therefore, the size of the insulating plate cannot be simply increased in order to cope with the above-described positional deviation.

The present disclosure is directed toward an increased insulation area between the electrode assembly and the outer housing can, improving the safety of the sealed battery.

Solution to Problem

According to an aspect of the present disclosure, there is provided a sealed battery comprising an electrode assembly; an outer housing can in which the electrode assembly is housed, the outer housing can having a cylindrical shape with a closed bottom; a sealing assembly for sealing an opening of the outer housing can; and an insulating plate disposed between an end surface of the electrode assembly and the outer housing can, the insulating plate having a first surface that faces toward the electrode assembly, and a second surface that is opposite the first surface, wherein the first surface of the insulating plate has an outer edge that is located more toward the outside of the insulating plate than an outer edge of the second surface of the insulating plate.

Advantageous Effects of Invention

A sealed battery according to the present disclosure enables an increased insulation area between the electrode assembly and the outer housing can, improving the safety of the battery. Good insulation performance is maintained between the electrode assembly and the outer housing can, even under vibration or shock acting during the use of the battery, or expansion or shrinkage of the electrode assembly upon charging or discharging.

DESCRIPTION OF EMBODIMENTS

An example embodiment of a sealed battery according to the present disclosure will be described in detail below with reference to the drawings. Selective combinations of multiple embodiments and modification examples described below are anticipated from the outset.

Although the following description describes by way of example a cylindrical battery 10 that includes a wound electrode assembly 14 housed in an outer housing can 16 having a cylindrical shape with a closed bottom, a sealed battery according to the present disclosure is not limited to a cylindrical battery, but may be a rectangular battery that includes an outer housing can having a rectangular shape with a closed bottom. An electrode assembly is not limited to a wound electrode assembly that includes a positive electrode and a negative electrode wound with a separator therebetween, but may be a laminated electrode assembly that includes a plurality of positive electrodes and a plurality of negative electrodes alternately laminated with a separator therebetween.

Figure 1:
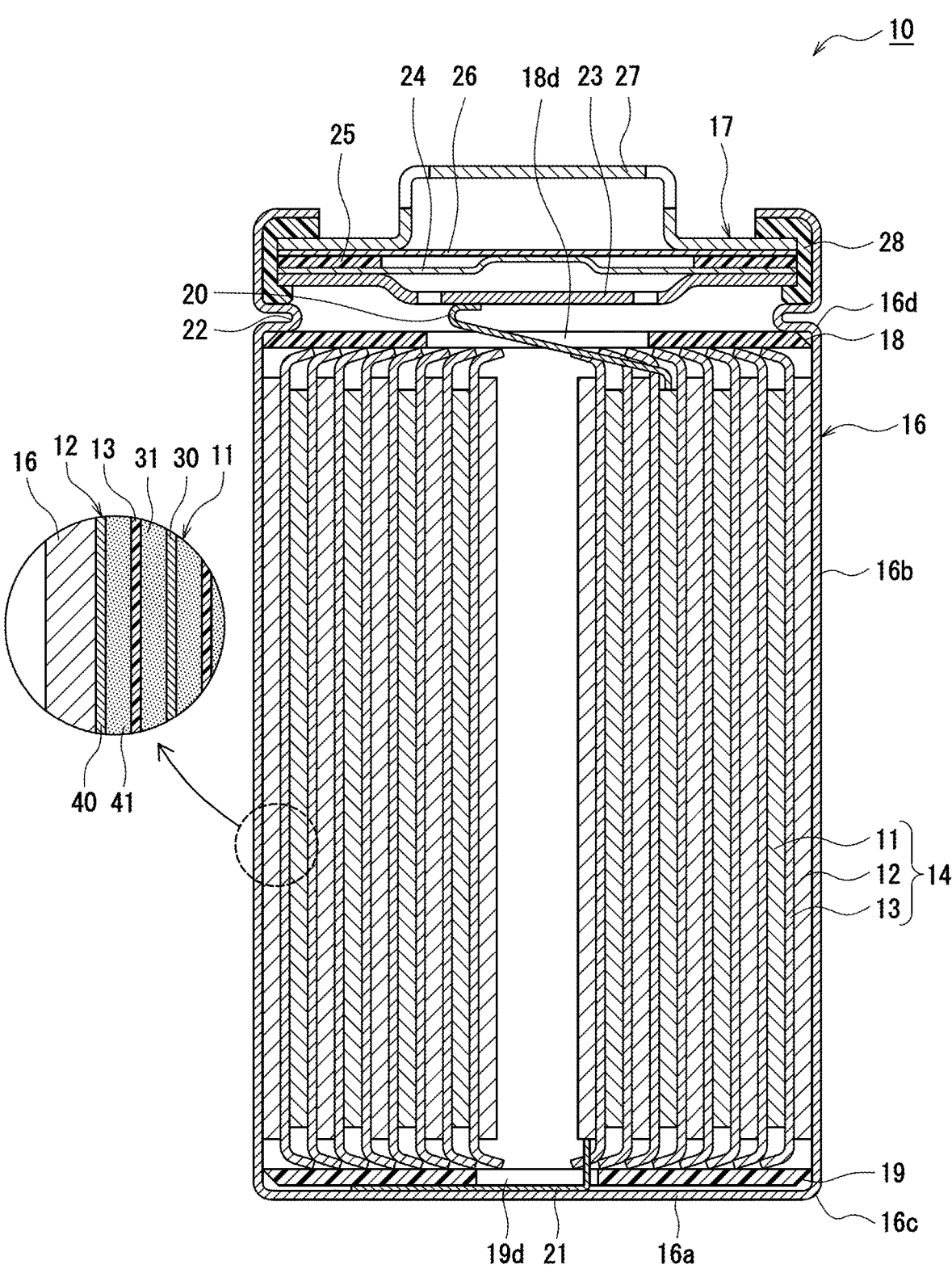
FIG. 1 is a cross-sectional view of a cylindrical battery according to an example embodiment.

FIG. 1 is a cross-sectional view of a cylindrical battery 10 according to an example embodiment. As illustrated in FIG. 1, the cylindrical battery 10 includes an electrode assembly 14 and an outer housing can 16 that receives the electrode assembly 14, the outer housing can 16 having a cylindrical shape with a closed bottom. The electrode assembly 14 includes a positive electrode 11, a negative electrode 12, and a separator 13, and has a wound configuration in which the positive electrode 11 and the negative electrode 12 are spirally wound with the separator 13 therebetween. The outer housing can 16 is a metal container having a cylindrical shape with a closed bottom, which is open on one side in an axial direction, the opening of the outer housing can 16 being closed by a sealing assembly 17. In the present specification, for ease of description, the term "upper" refers to the side toward the sealing assembly 17 of the battery, and the term "lower" refers to the side toward a bottom portion 16a of the outer housing can 16. The wound electrode assembly 14 has upper and lower end surfaces. A laminated electrode assembly has an end surface around the surface of the lamination.

The cylindrical battery 10 includes, for example, a non-aqueous electrolyte. The non-aqueous electrolyte is, as well as the electrode assembly 14, housed in the outer housing can 16. The non-aqueous electrolyte includes a non-aqueous solvent and an electrolyte salt dissolved in the non-aqueous solvent. Examples of the non-aqueous solvent include esters, ethers, nitriles, amides, and mixed solvents of two or more thereof. The non-aqueous solvent may contain a halogen-substituted product obtained by substituting, at least in part, hydrogens in such a solvent with halogen atoms such as fluorine. Examples of the electrolyte salt include a lithium salt such as $LiPF_6$. The electrolyte may be an aqueous electrolyte or a solid electrolyte.

The positive electrode 11, the negative electrode 12, and the separator 13 of the electrode assembly 14 are all long strips of material that are laminated alternately in the radial direction of the electrode assembly 14 as they are spirally wound. To prevent precipitation of lithium, the negative electrode 12 has a size slightly larger than the positive electrode 11. More specifically, the negative electrode 12 has a longer length than the positive electrode 11 both in the length direction and in the width direction (shorter length direction). The separator 13 has a size at least slightly larger than the positive electrode 11 and is, for example, disposed so that the positive electrode 11 is interposed between two separators 13.

The electrode assembly 14 includes a positive electrode lead 20 that is connected to the positive electrode 11 by, for example, welding, and a negative electrode lead 21 that is connected to the negative electrode 12 by, for example, welding. In this embodiment, the positive electrode lead 20 is connected to a center portion of the positive electrode 11 as viewed in the length direction. The negative electrode lead 21 is connected to a portion of the negative electrode 12 that is located toward the inside of the electrode assembly 14 as viewed in the radial direction; for example, an innermost circumferential surface of the electrode assembly 14. No negative electrode lead is provided on the outside of the electrode assembly 14 as viewed in the radial direction.

The positive electrode 11 includes a positive electrode core 30 and a positive electrode mixture layer 31 that is formed on at least one surface of the positive electrode core 30. Examples of the positive electrode core 30 include foil of metal that is stable in an electric potential range of the positive electrode 11, such as aluminum or an aluminum alloy, and a film having such metal disposed in its surface layer. The positive electrode mixture layer 31 contains a positive electrode active material, a conductive agent such as acetylene black, and a binder such as polyvinylidene fluoride, and is preferably formed on both sides of the positive electrode core 30. A lithium transition metal composite oxide, for example, is used as the positive electrode active material.

The negative electrode 12 includes a negative electrode core 40 and a negative electrode mixture layer 41 that is formed on at least one surface of the negative electrode core 40. Examples of the negative electrode core 40 include foil of metal that is stable in an electric potential range of the negative electrode 12, such as copper and a copper alloy, and a film having such metal disposed in its surface layer. The negative electrode mixture layer 41 contains a negative electrode active material and a binder such as styrene-butadiene rubber (SBR), and is preferably formed on both sides of the negative electrode core 40. Graphite or a silicon-containing compound, for example, is used as the negative electrode active material.

In the example illustrated in FIG. 1, the negative electrode 12 is disposed in an outermost circumferential portion of the electrode assembly 14, and a surface of the negative electrode core 40 that is exposed as the negative electrode mixture layer 41 is not formed thereon constitutes an outermost circumferential surface of the electrode assembly 14. The negative electrode core 40 is in contact with an inner circumferential surface of the outer housing can 16, and the negative electrode 12 and the outer housing can 16 are electrically connected to each other. The negative electrode lead 21 is connected to an inner surface of the bottom portion 16a of the outer housing can 16 by, for example, welding. In this embodiment, the outer housing can 16 serves as a negative electrode terminal. The positive electrode lead 20 is connected to an underside of the sealing assembly 17 by, for example, welding, and the sealing assembly 17 serves as a positive electrode terminal. The outermost circumferential surface of the electrode assembly 14 has a tape 50 affixed to each of its upper and lower ends for maintaining the wound configuration.

The outer housing can 16 includes the bottom portion 16a and a side portion 16b, the bottom portion 16a having a substantially perfect circular shape as viewed from the bottom, and the side portion 16b having a substantially cylindrical shape that is formed along the outer periphery of the bottom portion 16a. The outer housing can 16 has an inward projection 22, which is an inwardly protruding portion of the side portion 16b, and the inward projection 22 supports the sealing assembly 17. The inward projection 22 preferably has an annular shape extending along the circumference of the outer housing can 16, and supports the sealing assembly 17 on its upper surface. The sealing assembly 17 is fixed to an upper portion of the outer housing can 16 via the inward projection 22 and an opening edge portion of the outer housing can 16 that is swaged to the sealing assembly 17. A gasket 28 is provided between the outer housing can 16 and the sealing assembly 17, thereby maintaining the airtightness of the space inside the battery and maintaining the insulation between the outer housing can 16 and the sealing assembly 17.

The outer housing can 16 includes a curved corner portion 16c (R portion) in a boundary portion between the bottom portion 16a and the side portion 16b. The corner portion 16c does not form a right angle but has an arc shape as viewed in a cross-sectional view of the outer housing can 16, and is curved so as to bulge outward. Therefore, a flat portion of the bottom portion 16a has a diameter (D1) that is smaller than an inner diameter (D2) of the side portion 16b. For example, the diameter (D1) is 19.8 mm, and the inner diameter (D2) of the side portion 16b is 20.4 mm. In this case, the corner portion 16c has a length (width) of 0.3 mm in the radial direction of the outer housing can 16.

The outer housing can 16 also includes a curved corner portion 16d in a boundary portion between the inward projection 22 and the side portion 16b. Similarly as with the corner portion 16c, the corner portion 16d is curved so as to bulge outward. The corner portion 16d has a length that is, for example, substantially the same as the length of the corner portion 16c. Dimensions such as lengths or radii of curvature of the corner portions 16c and 16d may be substantially the same as each other or may differ from each other.

The sealing assembly 17 has a configuration in which an internal terminal plate 23, a lower vent member 24, an insulating member 25, an upper vent member 26, and a cap 27 are stacked in that order from the side on which the electrode assembly 14 is located. The components of the sealing assembly 17 have, for example, either a disc shape or a ring shape and are, except for the insulating member 25, electrically connected to each other. The lower vent member 24 and the upper vent member 26 are connected to each other at their center portions, and the insulating member 25 is interposed between their outer circumferential portions. In response to an increase in internal pressure of the battery due to abnormal heat generation, the lower vent member 24 breaks as it is deformed so as to push the upper vent member 26 toward the cap 27, resulting in an interruption of the current path between the lower vent member 24 and the upper vent member 26. In response to a further increase in internal pressure, the upper vent member 26 breaks, letting gas escape through an opening of the cap 27.

The cylindrical battery 10 includes an insulating plate disposed between an end surface of the electrode assembly 14 and the outer housing can 16. The cylindrical battery 10 includes, as the insulating plate, an upper insulating plate 18 and a lower insulating plate 19 that are respectively disposed above and below the electrode assembly 14. The upper insulating plate 18 is disposed between the electrode assembly 14 and the inward projection 22 of the outer housing can 16. The lower insulating plate 19 is disposed between the electrode assembly 14 and the bottom portion 16a of the outer housing can 16. In this embodiment, the upper insulating plate 18 and the lower insulating plate 19 maintain the insulation between the positive electrode 11 and the outer housing can 16. The upper insulating plate 18 maintains the insulation between the negative electrode 12 and the sealing assembly 17.

The upper insulating plate 18 has a disc shape and has an opening 18d in a center portion as viewed in the radial direction. The opening 18d is a through-hole, through which the positive electrode lead 20 passes, and also serves as a passageway for gas in the event of a failure. The positive electrode lead 20 extends through the opening 18d toward the sealing assembly 17 and is connected to an underside of the internal terminal plate 23. Similarly as with the upper insulating plate 18, the lower insulating plate 19 has a disc shape and has an opening 19d in a center portion as viewed in the radial direction. The negative electrode lead 21 extends through the opening 19d toward the bottom portion 16a of the outer housing can 16 and is connected to the inner surface of the bottom portion 16a.

Figure 2:
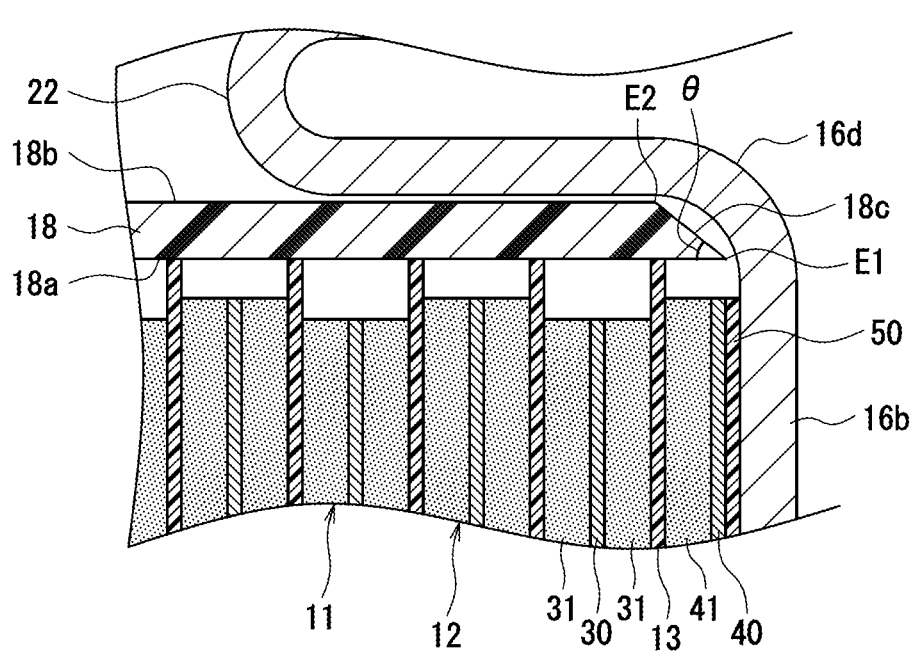
FIG. 2 is a cross-sectional view of an upper insulating plate according to an example embodiment, illustrating the outer periphery and its vicinity in an enlarged view.
Figure 3:
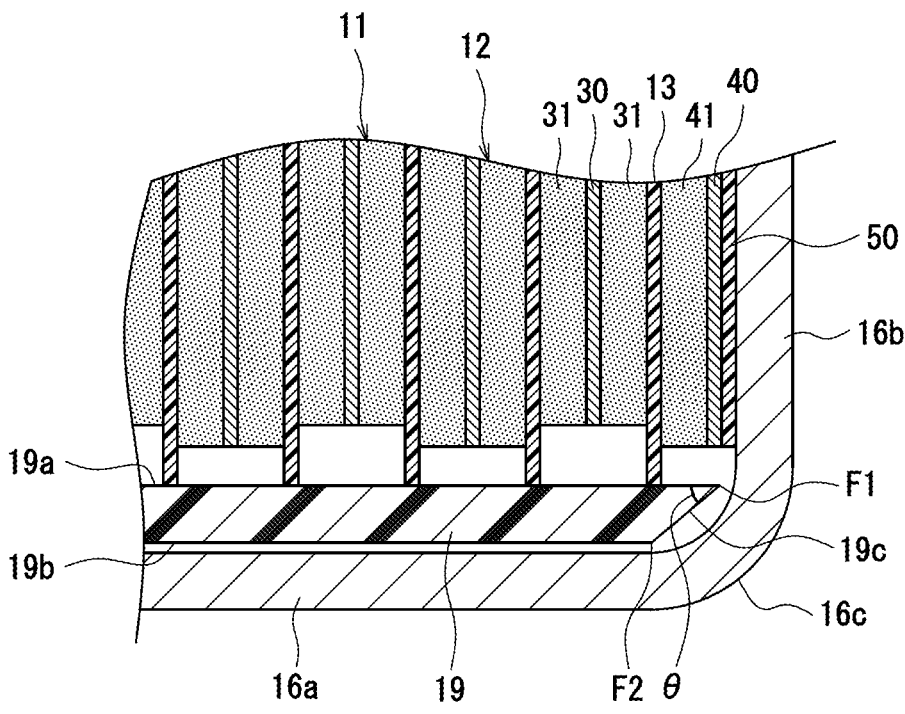
FIG. 3 is a cross-sectional view of a lower insulating plate according to an example embodiment, illustrating the outer periphery and its vicinity in an enlarged view.

Referring now to FIGS. 2 and 3, the insulating plate (the upper insulating plate 18 and the lower insulating plate 19) will be described in detail below. FIG. 2 is a cross-sectional view of the upper insulating plate 18, illustrating the outer periphery and its vicinity in an enlarged view. FIG. 3 is a cross-sectional view of the lower insulating plate 19, illustrating the outer periphery and its vicinity in an enlarged view.

As illustrated in FIGS. 1 and 2, the upper insulating plate 18 has a first surface 18a that faces toward the electrode assembly 14, and a second surface 18b that is opposite the first surface 18a. The first surface 18a and the second surface 18b, which are, for example, flat surfaces with no projection or depression, are in parallel with each other. The upper insulating plate 18 is disposed between the electrode assembly 14 and the sealing assembly 17 with the first surface 18a and the second surface 18b extending along the radial direction of the outer housing can 16. An upper portion of the outer housing can 16 has the inward projection 22 that supports the sealing assembly 17, and an outer circumferential portion of the upper insulating plate 18 is disposed between the electrode assembly 14 and the inward projection 22. The upper insulating plate 18 may be in contact with the inward projection 22.

The upper insulating plate 18 is a disc-shaped member that is mainly composed of an insulating resin. The resin that forms the upper insulating plate 18 is, for example, a polyolefin such as polypropylene, but is not particularly limited and may be a more heat-resistant resin such as a phenol resin. The upper insulating plate 18 may contain a non-conductive filler such as glass fiber. The upper insulating plate 18 has a thickness of, for example, greater than or equal to 0.05 mm and less than or equal to 0.5 mm, or greater than or equal to 0.1 mm and less than or equal to 0.3 mm. The opening 18d has a diameter that is, for example, greater than or equal to 30% and less than or equal to 50% the diameter (outside diameter) of the upper insulating plate 18, and is formed in the thickness direction through a center portion of the upper insulating plate 18 as viewed in the radial direction.

The first surface 18a of the upper insulating plate 18 has an outer edge E1 that is located more toward the outside of the upper insulating plate 18 than an outer edge E2 of the second surface 18b. In this embodiment, as the upper insulating plate 18 has a disc shape, the outside diameter of the first surface 18a is greater than the outside diameter of the second surface 18b. With the periphery of the opening 18d being substantially in parallel with the thickness direction of the upper insulating plate 18, the first surface 18a has a larger area than the second surface 18b. The outer edge E1 of the first surface 18a is located more toward the outside than the outer edge E2 of the second surface 18b throughout the entire circumference of the upper insulating plate 18.

A boundary portion between the inward projection 22 and the side portion 16b of the outer housing can 16 has the curved corner portion 16d, and the outer housing can 16 has a smaller inner diameter in the vicinity of the inward projection 22; however, the use of the upper insulating plate 18 allows the upper insulating plate 18 to be disposed to extend to above an outer circumferential portion of the electrode assembly 14. The use of a conventional insulating plate does not allow the insulating plate to be disposed to extend to above an outer circumferential portion of the electrode assembly 14, as the insulating plate and the corner portion 16d interfere with each other. With the use of the upper insulating plate 18, however, the upper insulating plate 18 does not interfere with the corner portion 16d even if the upper insulating plate 18 is disposed to extend to above an outer circumferential portion of the electrode assembly 14. Therefore, the use of the upper insulating plate 18 enables an increased insulation area between the electrode assembly 14 and the outer housing can 16.

The upper insulating plate 18 has an outside end surface 18c that is sloped with respect to the thickness direction. The outside end surface 18c is an outer circumferential side surface that is formed along the outer circumference of the upper insulating plate 18, connecting between the first surface 18a and the second surface 18b. The outside end surface 18c is sloped such that, the farther away from the second surface 18b and the closer to the first surface 18a, the more toward the outside of the upper insulating plate 18 it is located. In other words, the upper insulating plate 18 has the outside end surface 18c that is sloped with the outside diameter decreasing from the first surface 18a toward the second surface 18b. The outside end surface 18c, which is, for example, a flat surface with no projection or depression, is sloped at a constant angle from the outer edge E1 of the first surface 18a to the outer edge E2 of the second surface 18b.

As viewed in a cross-sectional view of the upper insulating plate 18, the outside end surface 18c and the first surface 18a form an angle θ of at least 85° or less, or preferably 60° or less. The minimum angle θ is not particularly limited but is, for example, 20°, or preferably 30°. The angle @ is preferably in a range of, for example, 30° to 60°, or 35° to 55°, or 40° to 50°. With the angle θ being within such a range, the upper insulating plate 18 and the corner portion 16d are unlikely to interfere with each other, and the insulation area between the electrode assembly 14 and the outer housing can 16 is easily increased.

The first surface 18a and the second surface 18b of the upper insulating plate 18 may differ from each other in terms of at least one of color and surface geometry. As the cylindrical battery 10 should have the upper insulating plate 18 disposed such that the first surface 18a having a larger area faces toward the electrode assembly 14, it is preferable that the identification of the respective surfaces is made easier by configuring the first surface 18a and the second surface 18b to have different colors or surface geometries. While the upper insulating plate 18 is typically disposed in the outer housing can 16 automatically by an apparatus for manufacturing the cylindrical battery 10, the manufacturing apparatus may have, in this embodiment, a sensor that is capable of detecting the color or the surface geometry of the upper insulating plate 18 so that the orientation of the upper insulating plate 18 can be controlled based on detection information from the sensor. For example, an optoelectronic sensor, such as a color sensor, or an image sensor is used as the sensor.

The first surface 18a and the second surface 18b may be of any colors that are identifiable by the sensor. At least one of the first surface 18a and the second surface 18b may have thereon a film of coating that contains a coloring material, or the first surface 18a and the second surface 18b may be composed of materials of different colors. Both of the two surfaces may have thereon a film of coating, and in this case, the films of coating on the respective surfaces contain different coloring materials. One of the first surface 18a and the second surface 18b may have thereon a recess such as an engraved mark. For the first surface 18a and the second surface 18b that have at least either different colors or different surface geometries, the respective surfaces also have different reflectivities to light of a specific wavelength.

As illustrated in FIGS. 1 and 3, the lower insulating plate 19 has a first surface 19a that faces toward the electrode assembly 14, and a second surface 19b that is opposite the first surface 19a. Similarly as with the upper insulating plate 18, the lower insulating plate 19 is a disc-shaped member that is composed of a resin such as a polyolefin. The upper insulating plate 18 and the lower insulating plate 19 may have the same composition and thickness as each other. The first surface 19a and the second surface 19b, which are, for example, flat surfaces with no projection or depression, are in parallel with each other. The lower insulating plate 19 is disposed between the electrode assembly 14 and the bottom portion 16a of the outer housing can 16 with the first surface 19a and the second surface 19b extending substantially in parallel with the bottom portion 16a.

The first surface 19a of the lower insulating plate 19 has an outer edge F1 that is located more toward the outside of the lower insulating plate 19 than an outer edge F2 of the second surface 19b, and the outside diameter of the first surface 19a is greater than the outside diameter of the second surface 19b. In this embodiment, as the periphery of the opening 19d is substantially in parallel with the thickness direction of the lower insulating plate 19, the first surface 19a has a larger area than the second surface 19b. The outer edge F1 of the first surface 19a is located more toward the outside than the outer edge F2 of the second surface 19b throughout the entire circumference of the lower insulating plate 19. The opening 19d has a diameter that is, for example, greater than or equal to 20% and less than or equal to 40% the outside diameter of the lower insulating plate 19, and is formed in the thickness direction through a center portion of the lower insulating plate 19 as viewed in the radial direction.

A boundary portion between the bottom portion 16a and the side portion 16b of the outer housing can 16 has the corner portion 16c, and the outer housing can 16 has a smaller inner diameter in the vicinity of the bottom portion 16a; however, the use of the lower insulating plate 19 allows the lower insulating plate 19 to be disposed to extend to below an outer circumferential portion of the electrode assembly 14. The use of a conventional insulating plate does not allow the insulating plate to be disposed to extend to below an outer circumferential portion of the electrode assembly 14, as the insulating plate and the corner portion 16c interfere with each other. With the use of the lower insulating plate 19, however, the lower insulating plate 19 does not interfere with the corner portion 16c even if the lower insulating plate 19 is disposed to extend to below an outer circumferential portion of the electrode assembly 14. Therefore, the use of the lower insulating plate 19 enables an increased insulation area between the electrode assembly 14 and the outer housing can 16.

The lower insulating plate 19 has an outside end surface 19c that is sloped with respect to the thickness direction. The outside end surface 19c is an outer circumferential side surface that is formed along the outer circumference of the lower insulating plate 19, connecting between the first surface 19a and the second surface 19b. The outside end surface 19c is sloped such that, the farther away from the second surface 19b and the closer to the first surface 19a, the more toward the outside of the lower insulating plate 19 it is located. In other words, the lower insulating plate 19 has the outside end surface 19c that is sloped with the outside diameter decreasing from the first surface 19a toward the second surface 19b. The outside end surface 19c, which is, for example, a flat surface with no projection or depression, is sloped at a constant angle from the outer edge F1 of the first surface 19a to the outer edge F2 of the second surface 19b.

Similarly as with the upper insulating plate 18, as viewed in a cross-sectional view of the lower insulating plate 19, the outside end surface 19c and the first surface 19a form an angle θ of at least 85° or less, or preferably 60° or less. The angle θ is preferably in a range of, for example, 30° to 60°, or 35° to 55°, or 40° to 50°. The first surface 19a and the second surface 19b may differ from each other in terms of at least one of color and surface geometry. The first surface 19a and the second surface 19b may have different colors or surface geometries that are identifiable by the sensor.

The upper insulating plate 18 and the lower insulating plate 19 can be manufactured through, for example, press-punching or rotatory punching in which a continuous sheet of resin is cut into the shapes of the respective insulating plates. In this process, the angle of a punching blade is adjusted so that the outside end surface 18c or 19c of an insulating plate forms a sloped surface that is sloped at the angle θ. A curved outside end surface 60c, which will be described later, can also be formed by adjusting the angle of a punching blade.

Figure 4A:
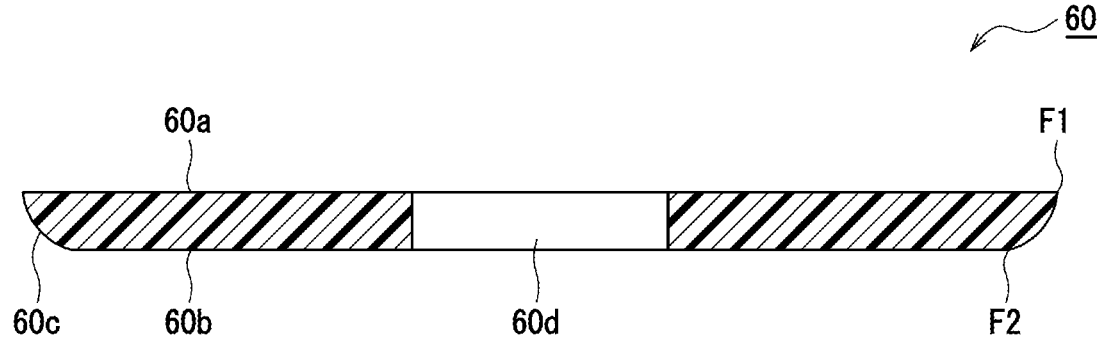
FIG. 4A illustrates a modification example of the lower insulating plate.
Figure 4B:
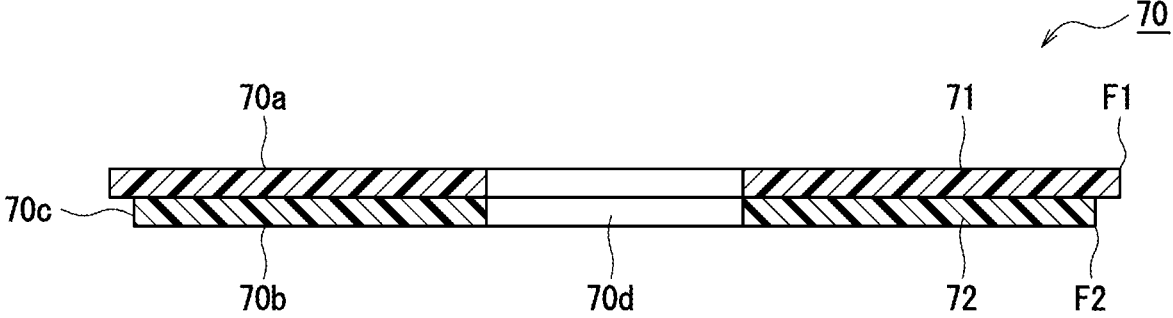
FIG. 4B illustrates a modification example of the lower insulating plate.
Figure 5:
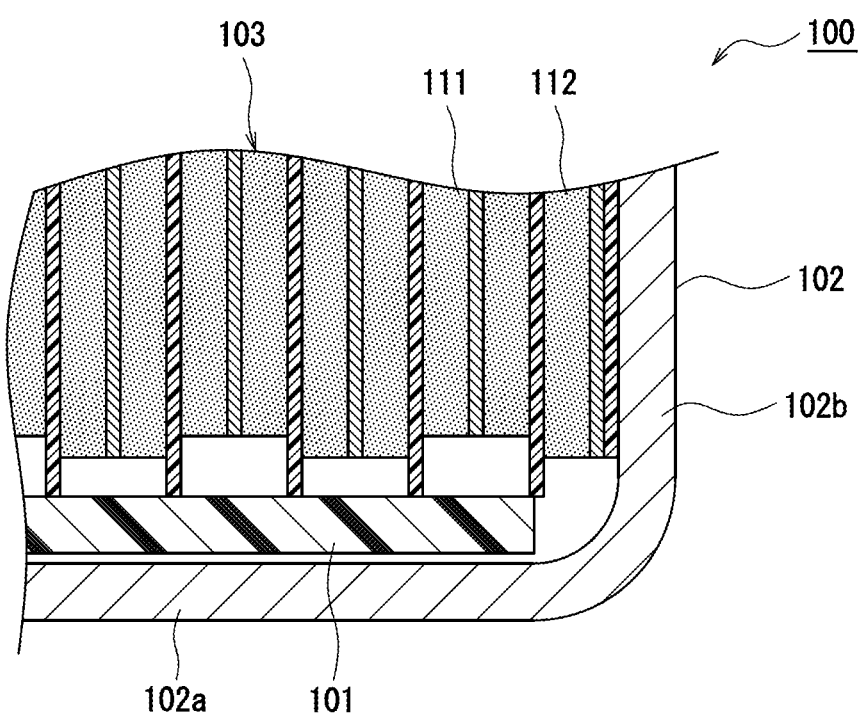
FIG. 5 is a cross-sectional view of a conventional cylindrical battery, illustrating the outer periphery of a lower insulating plate and its vicinity in an enlarged view.

FIGS. 4A and 4B are cross-sectional views each illustrating a modification example (lower insulating plate 60 or 70) of the lower insulating plate 19. The structures of the modification examples described below are also applicable to the upper insulating plate 18.

As illustrated in FIG. 4A, the lower insulating plate 60 has a first surface 60a that faces toward the electrode assembly 14, a second surface 60b that is opposite the first surface 60a, and the outside end surface 60c connecting between the first surface 60a and the second surface 60b. The lower insulating plate 60 has an opening 60d in a center portion as viewed in the radial direction. Similarly as with the lower insulating plate 19, the first surface 60a and the second surface 60b, which are flat surfaces with no projection or depression, are in parallel with each other, and the first surface 60a has an outer edge F1 that is located more toward the outside of the lower insulating plate 60 than an outer edge F2 of the second surface 60b.

On the other hand, the lower insulating plate 60 differs from the lower insulating plate 19 in that the outside end surface 60c of the lower insulating plate 60 is curved so as to bulge outward, whereas the lower insulating plate 19 has a sloped surface (outside end surface 19c) with no projection or depression. The outside end surface 60c is preferably a curved surface extending along the curved shape of the corner portion 16c of the outer housing can 16. The outside end surface 60c has a radius of curvature that is, for example, substantially the same as the radius of curvature of the corner portion 16c. This structure allows the lower insulating plate 60 to be easily disposed to extend to the vicinity of the corner portion 16c.

As illustrated in FIG. 4B, the lower insulating plate 70 differs from the lower insulating plate 19 or 60 in that the lower insulating plate 70 includes a stack of two insulating plates 71 and 72. The insulating plates 71 and 72 both have a disc shape, and the outside diameter of the insulating plate 71 is greater than the outside diameter of the insulating plate 72. The insulating plates 71 and 72 have outside end surfaces that are substantially in parallel with the thickness direction of the lower insulating plate 70. The lower insulating plate 70 has an opening 70d in a center portion as viewed in the radial direction, with the opening 70d in the insulating plate 71 and the opening 70d in the insulating plate 72 being of the same size.

The lower insulating plate 70 has a shape with the stack of two insulating plates 71 and 72 of different outside diameters, whereby a first surface 70a has an outer edge F1 that is located more toward the outside of the lower insulating plate 70 than an outer edge F2 of a second surface 70b, and the outside diameter of the first surface 70a is greater than the outside diameter of the second surface 70b. The lower insulating plate 70 has an outside end surface 70c which is not a sloped surface similar to the outside end surface 19c, and the outside end surface 70c forms a step height in an intermediate portion in the thickness direction of the lower insulating plate 70 as the outside diameter changes abruptly. Although FIG. 4B illustrates a two-layer structure composed of the two insulating plates 71 and 72 by way of example, the insulating plate may have a multilayer structure of three or more layers.

An effect of increasing the insulation area will now be described by giving a specific example for the outer housing can 16 and the lower insulating plate 19. An outer housing can having a cylindrical shape with a closed bottom, the side portion 16b having an inner diameter of 20.4 mm, and the corner portion 16c having a width of 0.3 mm (the flat portion of the bottom portion 16a having a diameter of 19.8 mm), is used as the outer housing can 16. A polypropylene insulating plate having a disc shape with a thickness of 0.2 mm, the second surface 19b having an outside diameter of 19.6 mm, is used as the lower insulating plate 19. In this case, there is a clearance of 0.1 mm on each side of the insulating plate in the radial direction. Such an amount of clearance is preferably maintained as a margin of manufacturing tolerance.

The outside end surface 19c of the lower insulating plate 19 is a sloped surface that is sloped such that, the farther away from the second surface 19b and the closer to the first surface 19a, the greater the outside diameter of the insulating plate, with the outside end surface 19c and the first surface 19a forming an angle θ of 45° With the angle θ being 45°, the outside diameter of the first surface 19a is greater than the outside diameter (19.6 mm) of the second surface 19b by a length corresponding to twice the thickness of the insulating plate (0.2 mm×2). More specifically, the outside diameter of the first surface 19a is 20 mm.

In consideration of interference between the insulating plate and the corner portion 16c, and manufacturing tolerance, the use of a conventional insulating plate having an outside end surface in parallel with the thickness direction would require that the outside diameter should be less than or equal to 19.6 mm. In this case, a region that is not covered by the insulating plate is present in an outer circumferential portion of the electrode assembly, the region having an area (25.1 mm$^2$) calculated by the following Expression A.

$$(20.4/2)^2 \times 3.14 - (19.6/2)^2 \times 3.14 \approx 25.1 \qquad \text{Expression A:}$$

On the other hand, when the lower insulating plate 19 is used, as the outside diameter of the first surface 19a is 20 mm, a region that is not covered by the lower insulating plate 19 has a significantly reduced area (12.7 mm$^2$) as calculated by the following Expression B.

$$(20.4/2)^2 \times 3.14 - (20/2)^2 \times 3.14 \approx 12.7 \qquad \text{Expression B:}$$

In other words, the use of the lower insulating plate 19 having the above-described dimensions instead of a conventional insulating plate enables a reduction of about 50% in the area of a region that is not covered by the lower insulating plate 19 compared with a conventional insulating plate.

As described above, the cylindrical battery 10 having the above-described structure includes an insulating plate that has an outside diameter such that the outside diameter of the first surface>the outside diameter of the second surface, enabling a configuration in which the curved corner portion of the outer housing can 16 and the insulating plate do not interfere with each other even if the size of the insulating plate is increased to increase the area over which it covers an outer circumferential portion of the electrode assembly 14. This enables an increased insulation area between the electrode assembly 14 and the outer housing can 16, so that good insulation performance is maintained even if a relative position between the electrode assembly 14 and the insulating plate deviates from an intended position. The cylindrical battery 10 is also expected to provide an effect of suppressing positional deviation itself of the insulating plate. The lower insulating plate 19 is more preferably used when the negative electrode lead is not present toward the outside of the electrode assembly 14 as viewed in the radial direction.

The above-described embodiments may undergo design changes as desired within a range in which the changes do not contradict purposes of the present disclosure. Although, in the above-described embodiments, the outer housing can 16 having the inward projection 22 is given by way of example, the outer housing can may lack an inward projection. A sealing assembly may be fixed to an upper portion of the outer housing can by swaging a side portion of the outer housing can at a position where it faces an outer circumferential surface of the sealing assembly. In this case, a conventional insulating plate having a first surface and a second surface, the first surface having an outer edge that is aligned with an outer edge of the second surface in the thickness direction of the insulating plate, may be used as the upper insulating plate. Although, in the above-described embodiments, a structure including the negative electrode lead 21 connected to the outer housing can 16 is given by way of example, the positive electrode lead may be connected to the outer housing can.

REFERENCE SIGNS LIST 10 cylindrical battery
11 positive electrode
12 negative electrode
13 separator
14 electrode assembly
16 outer housing can
16*a* bottom portion
16*b* side portion
16*c*, 16*d* corner portion
17 sealing assembly
18 upper insulating plate
18*a*, 19*a* first surface
18*b*, 19*b* second surface
18*c*, 19*c* outside end surface
18*d*, 19*d* opening
19 lower insulating plate
20 positive electrode lead
21 negative electrode lead
22 groove portion 23 internal terminal plate
24 lower vent member
25 insulating member
26 upper vent member
27 cap
28 gasket
30 positive electrode core
31 positive electrode mixture layer
40 negative electrode core
41 negative electrode mixture layer
50 tape

The invention claimed is:

1. A sealed battery comprising:
an electrode assembly;
an outer housing can in which the electrode assembly is housed, the outer housing can having a cylindrical shape with a closed bottom;
a sealing assembly for sealing an opening of the outer housing can; and
an insulating plate disposed between an end surface of the electrode assembly and the outer housing can,
wherein the outer housing can includes:
a bottom portion defining the closed bottom;
a side portion extending from an outer periphery of the bottom portion toward the opening in an axial direction of the cylindrical shape; and
an inward projection configured to support the sealing assembly, the inward projection inwardly protruding from the side portion in a radial direction of the cylindrical shape; and
wherein the insulating plate has a disc shape that defines:
a first surface that faces toward the electrode assembly in the axial direction of the cylindrical shape; and
a second surface opposite the first surface in the axial direction of the cylindrical shape,
the second surface is located between the bottom portion and the inward projection in the axial direction of the cylindrical shape,
in the radial direction of the cylindrical shape, an outermost edge of the first surface is located more outward than an outermost edge of the second surface, and
the outermost edge of the second surface is directly adjacent to an inner surface of the outer housing can.

2. The sealed battery according to claim 1, wherein the insulating plate has an outside end surface that is sloped such that, the farther away from the second surface and the closer to the first surface, the more toward the outside of the insulating plate it is located.

3. The sealed battery according to claim 1, wherein the outside end surface and the first surface form an angle θ of 30° to 60° as viewed in a cross-sectional view of the insulating plate.

4. The sealed battery according to claim 1,
wherein an outside diameter of the first surface is greater than an outside diameter of the second surface.

5. The sealed battery according to claim 1, wherein the insulating plate is disposed between the electrode assembly and the bottom portion of the outer housing can.

6. The sealed battery according to claim 1,
wherein the insulating plate is disposed between the electrode assembly and the inward projection.

7. The sealed battery according to claim 1, wherein the first surface and the second surface of the insulating plate differ from each other in terms of at least one of color and surface geometry.

* * * * *